US008914180B2

(12) United States Patent
Holmes et al.

(10) Patent No.: US 8,914,180 B2
(45) Date of Patent: Dec. 16, 2014

(54) HYBRID POWERTRAIN WITH GEARED STARTER MOTOR AND BELT ALTERNATOR STARTER AND METHOD OF RESTARTING AN ENGINE

(71) Applicant: GM Global Technology Operations LLC, Detroit, MI (US)

(72) Inventors: Alan G. Holmes, Clarkston, MI (US); Shawn Scott Hawkins, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/061,067

(22) Filed: Oct. 23, 2013

(65) Prior Publication Data

US 2014/0052321 A1    Feb. 20, 2014

Related U.S. Application Data

(62) Division of application No. 13/228,513, filed on Sep. 9, 2011, now Pat. No. 8,606,450.

(51) Int. Cl.
*B60L 9/00* (2006.01)
*B60L 11/00* (2006.01)
(Continued)

(52) U.S. Cl.
CPC ............... *F02N 11/00* (2013.01); *B60K 6/485* (2013.01); *Y02T 10/7066* (2013.01); *B60W 20/10* (2013.01); *B60W 20/1062* (2013.01); *Y10S 903/902* (2013.01); *B60W 10/26* (2013.01); *Y02T 10/6226* (2013.01); *B60Y 2400/47* (2013.01); *B60W 2540/06* (2013.01); *Y02T 10/7016* (2013.01); *Y02T 10/7005* (2013.01); *B60W 2510/246* (2013.01); *B60W 20/00* (2013.01); *B60W 20/40* (2013.01); *B60K 6/28* (2013.01); *Y02T 10/7011* (2013.01); *B60L 11/1868* (2013.01); *B60W 10/08* (2013.01); *Y10S 903/93* (2013.01)
USPC ..................... 701/22; 180/65.22; 180/65.265; 903/930; 903/902

(58) Field of Classification Search
CPC . B60W 10/08; B60W 20/40; B60W 20/1062; B60W 2510/246; B60W 10/26; B60W 2540/06; B60W 20/00; B60W 20/10; B60L 11/1868; Y02T 10/7066; Y02T 10/7011; Y02T 10/7016; Y02T 10/7005; Y10S 903/902; F02N 11/00
USPC ..................... 701/22, 113; 180/65.22, 65.265; 903/930
See application file for complete search history.

(56) References Cited

U.S. PATENT DOCUMENTS 6,554,088 B2 *  4/2003  Severinsky et al. ........ 180/65.23
7,267,090 B2 *  9/2007  Tamai et al. ............... 123/179.3
(Continued)

*Primary Examiner* — Mary Cheung
*Assistant Examiner* — Frederick Brushaber
(74) *Attorney, Agent, or Firm* — Quinn Law Group, PLLC

(57) ABSTRACT

A hybrid powertrain has an engine, a starter motor, and a gear train that connects the starter motor with the engine, and a motor/generator. A belt drive train connects the motor/generator with the engine. The powertrain has a first energy storage device with a first operating range of voltage and a second energy storage device with a second operating range of voltage at least partially in common with the first operating range of voltage. A controller places a switching device in an on-state so that the first energy storage device is connected with the second energy storage device or in an off-state in which the first energy storage device is disconnected from the second energy storage device. The controller causes the switching device to be in the off-state and the starter motor and the motor/generator to be powered with energy from the first energy storage device to restart the engine.

9 Claims, 2 Drawing Sheets

(51) Int. Cl.
  *G05D 1/00*     (2006.01)
  *G05D 3/00*     (2006.01)
  *B60K 6/485*    (2007.10)
  *B60W 20/00*    (2006.01)
  *B60W 10/26*    (2006.01)
  *B60K 6/28*     (2007.10)
  *F02N 11/00*    (2006.01)
  *B60L 11/18*    (2006.01)
  *B60W 10/08*    (2006.01)

(56) References Cited

U.S. PATENT DOCUMENTS

| | | | |
|---|---|---|---|
| 7,681,545 B2* | 3/2010 | Taki et al. | 123/179.3 |
| 7,891,330 B2* | 2/2011 | Kishibata et al. | 123/179.3 |
| 8,395,350 B2* | 3/2013 | Sloan et al. | 320/105 |
| 2008/0097664 A1* | 4/2008 | Aoyama et al. | 701/36 |
| 2011/0012553 A1* | 1/2011 | Sloan et al. | 320/105 |

* cited by examiner

HYBRID POWERTRAIN WITH GEARED STARTER MOTOR AND BELT ALTERNATOR STARTER AND METHOD OF RESTARTING AN ENGINE

CROSS-REFERENCE TO RELATED APPLICATION

This application is a Divisional application of U.S. patent application Ser. No. 13/228,513, filed on Sep. 9, 2011.

TECHNICAL FIELD

The invention relates to a hybrid powertrain that has both a starter motor and a motor/generator used for an engine restart.

BACKGROUND

Hybrid electric vehicles offer reduced fuel consumption and emissions by utilizing both an electric motor/generator and an internal combustion engine and an onboard controller programmed to vary use of each of the engine and motor/generator during different driving conditions to achieve peak efficiency.

One type of hybrid electric vehicle is referred to as a belt-alternator-starter hybrid vehicle. This type of vehicle has a motor/generator operatively connected to an engine crankshaft by a belt and pulley system. The motor/generator is used to start the engine from a key start and may be recharged by the engine during regenerative braking "Key start" or "first start" refers to the engine being started for the first time after the engine has been completely shut off for an extended time. A key start is typically initiated by a vehicle operator inserting a key into the ignition and turning the key to a key-up or further to a key-crank position. This is in contrast to the "quick start" or "restart" which occurs after the engine has been temporarily shutdown by the electronic controller as driving conditions allow, such as when the vehicle is stopped at a stop light. This helps to reduce emissions and increase fuel economy. A high voltage battery (e.g., a 120 volt battery) is typically used to provide sufficient power to accomplish a restart and is also used during regenerative braking.

Most hybrid vehicles also employ a low voltage battery (e.g., a 12 volt battery) to run typical motor vehicle accessories, such as headlights, an audio system, the ECU and other electronic components. The low voltage battery may also be recharged by the high voltage battery (via an auxiliary power module ("APM"), also referred to as a DCDC converter, that converts power from the high to the low voltage) assuming the APM has been activated (which is only after the engine is running). As used herein, "activating" the APM means causing the APM to begin converting voltage from the high voltage level to a lower voltage level, or vice versa.

Different hybrid motor vehicles may utilize the high and low voltage battery systems differently in performing a key start of the hybrid motor vehicle. In one configuration of a hybrid motor vehicle, the high voltage battery is used to perform the key start and the low voltage battery is retained for powering vehicle accessories but is not utilized in the key start process. In another configuration, the low voltage battery is utilized in a key start by supplying power to a starter motor to start the engine, with the high voltage battery utilized for restarts but not for key starts. The low voltage battery also powers the motor vehicle accessories after the key start. In yet another hybrid vehicle configuration, the starter motor initially turns the engine to a first speed during the key start and the motor/generator is powered by the high voltage battery and is then employed in tandem with the starter motor to assist in turning the engine to a final start speed. In some configurations, the APM converts energy stored in the high voltage battery to the voltage level of the low voltage battery when the low voltage battery is used in a key start.

SUMMARY

A powertrain is provided with two energy storage devices selectively connectable by a switching device to control power flow to a starter motor and a motor/generator during engine restarts and other operating modes, such as key starts and for charging of the energy storage devices. Both of the energy storage devices are used under most operating conditions. This allows the powertrain to function with a relatively small motor/generator and with energy storage devices of lower voltage than typically used on hybrid vehicles, reducing the overall cost of the powertrain without reducing drive quality and while retaining fuel economy benefits.

Specifically, a hybrid powertrain is provided that includes an engine, a starter motor and a motor/generator. A gear train operatively connects the starter motor with the engine. A belt drive train operatively connects the motor/generator with the engine. The powertrain has a first energy storage device and a second energy storage device. The first energy storage device is operable within a first range of operating voltage having a first minimum voltage and a first maximum voltage. The second energy storage device is operable within a second range of operating voltage having a second minimum voltage and a second maximum voltage. The first range of operating voltage is at least partially in common with the second range of operating voltage in that the second maximum voltage is greater than the first minimum voltage and less than the first maximum voltage.

A switching device is selectively operable in an on-state and an off-state. The first energy storage device and the second energy storage device are operatively connected with one another when the switching device is in the on-state and are operatively disconnected from one another when the switching device is in the off-state. A controller is operatively connected to the switching device, the starter motor and the motor/generator. The controller is operable to cause the switching device to be in the off-state and to power both the starter motor and the motor/generator with the first energy storage device during a restart of the engine. The starter motor and the motor/generator are operatively connected with only the first energy storage device during restarting of the engine when the switching device is in the off-state. The switching device may be in the on-state when an operating parameter of the powertrain is different than a predetermined reference parameter by at least a predetermined amount. For example, if the engine operating temperature or operating temperature of one of the energy storage devices is below a predetermined temperature, the switching device may be in the on-state. This may allow the second energy storage device, which may be a lead-acid battery, to be used during relatively cold temperature restarts.

In one embodiment, the controller is operable to cause both the starter motor and the motor/generator to be used in tandem throughout the entire engine restart. In another embodiment, only the starter motor is powered at the beginning of the restart, and then the motor/generator is powered during the restart event only after a predetermined amount of time has passed since initiation of the restart or after the engine has reached a predetermined speed. The controller may also determine when the restart is complete, and cause the switching device to be in the on-state if it is not already in the on-state.

The controller may also be operable to advantageously coordinate operation of the switching device, the motor/generator and the starter motor to manage power flow in other vehicle operating states, such as during key starts, for charging of one or both energy storage devices, for regenerative braking, and for preparing for a subsequent restart following an automatic shutdown of the engine.

The above features and advantages and other features and advantages of the present invention are readily apparent from the following detailed description of the best modes for carrying out the invention when taken in connection with the accompanying drawings.

DETAILED DESCRIPTION

Figure 1:
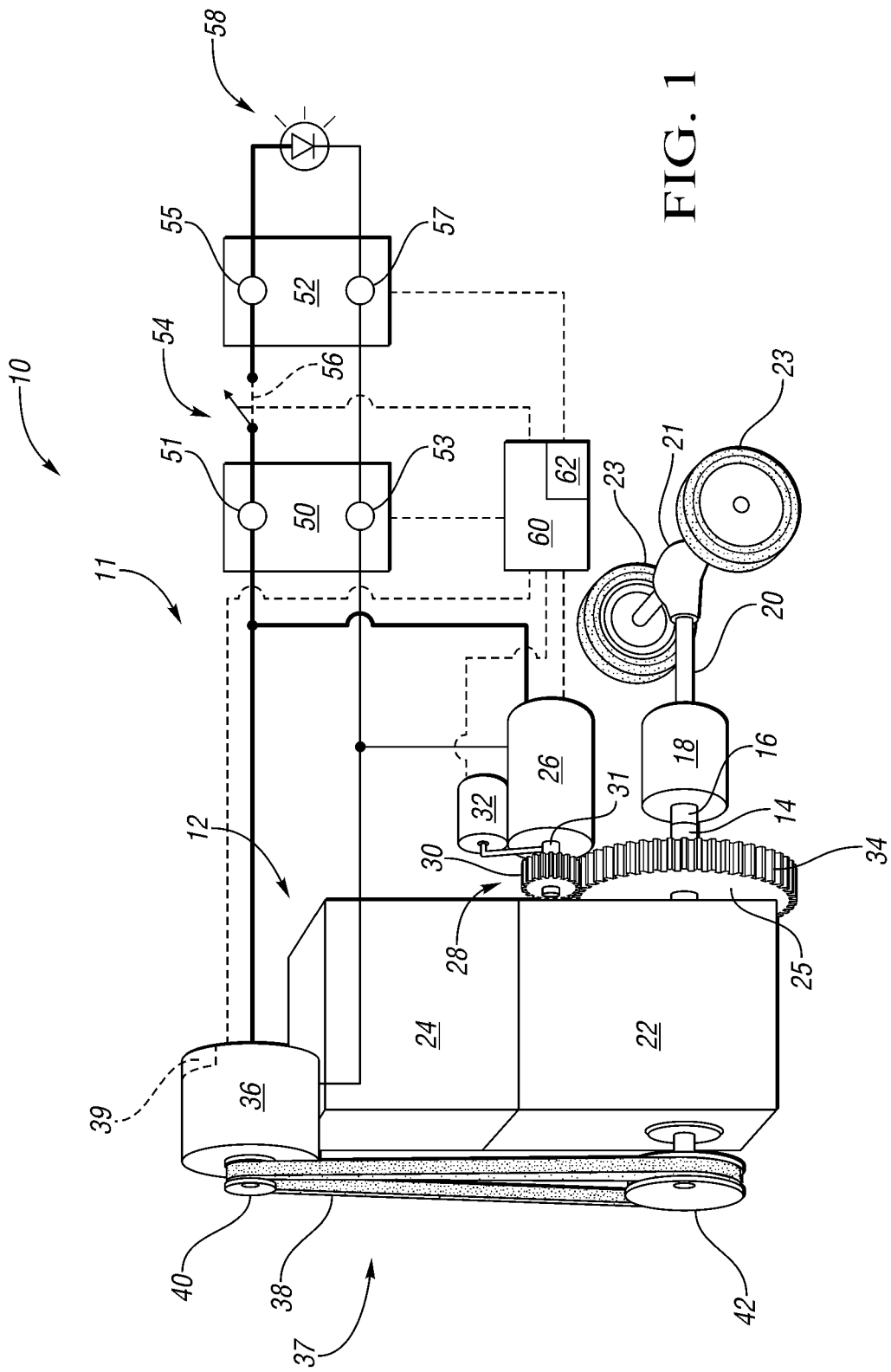
FIG. 1 is a schematic illustration of a hybrid powertrain with a starter motor and a motor/generator operatively connected to an engine.

Referring to the drawings, wherein like reference numbers refer to like components throughout the several views, FIG. 1 shows a portion of a vehicle 10 with a hybrid powertrain 11 that includes an internal combustion engine 12 with an output member 14, such as a crankshaft, operatively connected to an input member 16 of a transmission 18. The transmission 18 includes a gearing arrangement and clutches (not shown) through which torque flows from the input member 16 to an output member 20 and through a final drive 21 to vehicle wheels 23 to propel the vehicle 10. The wheels 23 shown may be front wheels or rear wheels. A second pair of wheels that is not shown may also be powered by the powertrain 11, or may be unpowered.

The engine 12 includes a crankcase 22 and a cylinder block 24. An engine flywheel 25 rotates with the crankshaft 14. Two different components for starting the engine 12 are operatively connectable to the crankshaft 14. A starter motor 26 is operatively connectable to the crankshaft 14 through a gear train 28. The gear train 28 includes a starter gear 30 and an external gear 34 on the flywheel 25. The starter gear 30 is connected for rotation with a shaft 31 of the starter motor 26. A solenoid 32 is selectively energizable to move the starter gear 30 along the shaft 31 into meshing engagement with the external gear 34 on the flywheel 25.

A motor/generator 36 is also operatively connectable to the crankshaft 14 for starting the engine 12. The motor/generator 36 is operatively connected to the crankshaft 14 by a drive train 37 that includes a belt 38 that engages with a pulley 40 connected to rotate with a shaft of the motor/generator 36 and with a pulley 42 connected to rotate with the crankshaft 14. The motor/generator 36 may be referred to as a belt-alternator-starter, and may be configured to be powered by 12 volts. In another embodiment, the drive train 37 includes a chain in lieu of the belt 38 and sprockets in lieu of the pulleys 40, 42. Both embodiments of the drive train 37 are referred to herein as a "belt drive train". The motor/generator 36 has an integrated power inverter 39 that converts direct current provided by one or both energy storage devices 50, 52 to alternating current needed to power the motor/generator 36 to function as a motor, and converts alternating current to direct current to be directed to the energy storage devices 50, 52 when the motor/generator 36 functions as a generator.

A first energy storage device 50 and a second energy storage device 52 are used separately or together under different operating conditions to provide power for a key start or for a restart of the engine 12. The first energy storage device 50 may be a lithium ion battery. The first energy storage device 50 may have a nominal voltage of 3.75 volts per cell with four cells for a total nominal voltage of 15 volts, while the second energy storage device 52 may have a nominal voltage of 2 volts per cell with six cells for a total nominal voltage of 12 volts. The first energy storage device 50 is operable in a first range of operating voltage having a first minimum voltage and a first maximum voltage between its terminals 51, 53. The first minimum voltage of the first energy storage device 50 may be 2 volts per cell for a total minimum voltage of 8 volts, such as during a key start. The first maximum voltage for the first energy storage device 50 may be 4.25 volts per cell for a total maximum voltage of 17 volts. The first maximum voltage of the first energy storage device would only be achieved under regenerative braking discussed herein, using the motor/generator 36, with the switching device 54 in the off-state. When the regenerative braking event ends, the voltage in the first energy storage device 50 would fall to approximately 15 volts and the switching device 54 would be placed in the on-state again.

The second energy storage device 52 may be a lead-acid battery. The second energy storage device 52 may have a nominal voltage of about 12 volts with a second range of operating voltage between its terminals 55, 57 having a second minimum voltage of about 0.33 volts per cell with six cells total for a total minimum voltage of about 8 volts during a key start. The second maximum voltage for the second energy storage device 52 may be approximately 2.5 volts per cell for a total second maximum voltage of 15 volts, such as during rapid charging. Thus, the first and second ranges of operating voltage are at least partially in common, i.e., overlap or share at least some voltage range, as the second maximum voltage is greater than the first minimum voltage and less than the first maximum voltage. If the first energy storage device 50 is a lithium-ion battery, its operating life is increased if kept near the lower end of the first range of operating voltage. If the second energy storage device 52 is a lead-acid battery, it will have its longest operating life if kept near the upper end of the second range of operating voltage. Accordingly, the first and second energy storage device 50, 52 are designed to function well together in the range of overlap of their range of operating voltages.

A switching device 54 is selectively controllable to operate in an off-state, represented by an open position shown, and an on-state, represented by the closed position 56, indicted in phantom. The switching device 54 may be a normally-open (i.e., normally in the off-state) device, a normally-closed (i.e., normally in the on-state) device, a bi-stable (capable of remaining in either the on-state or off-state without outside signal) device, an electromechanical device, or a solid state device. In the on-state, the switching device 54 completes a circuit to operatively connect the starter motor 26, the motor/generator 36 and the first energy storage device 50 with the second energy storage device 52, so that both the starter motor 26 and the motor/generator 36 are operatively connected with both the first energy storage device 50 and the second energy storage device 52. When the switching device 54 is in the off-state, the starter motor 26 and the motor/generator 36 are operatively connected with the first energy storage device 50 but not with the second energy storage device 52. A vehicle electrical system 58 is continuously operatively connected with the second energy storage device 52, and is only operatively connected to the first energy storage device 50 when the switching device 54 is in the on-state. Accordingly, when the switching device 54 is in the off-state, such as during regenerative braking or an engine restart, as discussed below, the brightness of lights in the vehicle electrical system 58 will not be affected and the voltage range that the vehicle electrical system 58 is exposed to is controlled to a relatively narrow range.

A controller 60 is operatively connected to the switching device 54, to both of the energy storage devices 50, 52, to the starter motor 26, to the solenoid 32, to the engine 12, and to the motor/generator 36, as indicated with dashed lines. The controller 60 includes a processor 62 with a stored algorithm that determines how the controller 60 controls operation of the starter motor 26, the motor/generator 36, and the switching device 54 based on vehicle operating conditions measured or estimated from input signals provided by sensors, not shown. The vehicle operating conditions may include temperature of the engine 12, temperature of the energy storage device 50, temperature of the energy storage device 52, speed and torque at the crankshaft 14, and speed and torque at the output member 20.

Based on the input signals received by the controller 60, the processor 62 determines whether the switching device 54 should be in the on-state or the off-state, whether the starter motor 26 should be powered, whether the solenoid 32 should be energized, and whether the motor/generator 36 should be energized and operated as a motor or as a generator. The controller 60 then sends control signals to the various components to cause them to operate in accordance with the stored algorithm and the vehicle operating conditions.

For example, if the controller 60 determines that a key start has been initiated, the switching device 54 is placed in the on-state and the solenoid 32 engages the starter gear 30. The starter motor 26 performs the entire key start (i.e., the entire time that an ignition key is in a closed position) using energy supplied from both of the energy storage devices 50, 52. The motor/generator 36 is not powered during the key start. Immediately following the key start, the engine 12 runs or idles, i.e. does not shut off, until its temperature and the parameters (e.g. temperature and charge) of the energy storage device 50 meet predetermined parameters. The switching device 54 remains closed. Also immediately following the key start, if the charge of the second energy storage device 52 is below a predetermined level, then the motor/generator 36 is controlled to function as a generator to provide electricity to gradually charge the second energy storage device to a predetermined level of charge. The switching device 54 remains in the on-state in order for this charging to occur.

When the vehicle 10 is braking, the motor/generator 36 generates electricity at the maximum rate possible based either on its power limit or based on the torque limits imposed by the belt drive 37, drive quality, or the maximum rate that electricity can be accepted by the energy storage devices 50, 52 and vehicle electrical system 58 or by the first energy storage device 50 alone. During a regenerative braking event, the switching device 54 may be in the on-state. If the voltage rises to the maximum for the second energy storage device 52 (e.g. 15 volts) or the maximum for the accessories in the vehicle electrical system 58 (e.g. 14 volts) and the state of charge of the first energy storage device 50 is below a predetermined level (e.g., less than 75%), then the controller 60 places the switching device 54 in the off-state and the motor/generator 36 charges only the first energy storage device 50 up to its maximum voltage (e.g., 17 volts) or a predetermined maximum state of charge (e.g., 90%). The controller 60 then reduces or ceases functioning of the motor/generator 36 as a generator so that the amount of electricity produced by the motor/generator 36 remains within the predefined limits of maximum voltage and maximum state of charge tolerated by the first energy storage device 50.

When the temperature of the engine 12, and the temperature and state of charge of the first energy storage device 50 are sufficient, and if the engine 12 is not required to drive the vehicle 10 (such as when the vehicle 10 is near zero speed with the brake pedal depressed) then the engine 12 shuts down (referred to as an automatic shutdown) and the solenoid 32 engages the starter gear 30. This engagement may take place before the crankshaft 14 has stopped rotating to facilitate meshing of the gears 30 and 34. When the engine 12 shuts down, the motor/generator 36 may have been charging the first energy storage device 50 during regenerative braking, so that the switching device 54 may be in the off-state. If so, then the switching device may remain in the off-state, awaiting a subsequent restart of the engine 12, potentially with the two energy storage devices 50, 52 at different voltages (e.g. 15 volts for the first energy storage device 50 and 12 volts for the second energy storage device 52).

When the need for the engine 12 is imminent (such as when the brake pedal is released), the switching device 54 is placed in the off-state if it is not already in the off-state. The solenoid 32 has previously been energized to hold the starter gear 30 engaged, and the starter motor 26 and the motor/generator 36 are then energized via the first energy storage device 50 to rotate the engine 12. The starter motor 26 and the motor/generator 36 may each operate as motors during the entire restart of the engine 12, or the starter motor 26 alone may initiate the restart, and the motor/generator 36 will then be controlled to function as a motor to assist with the restart only after a predetermined amount of time has passed since the restart was initiated (e.g., since the starter motor 26 was energized), or only after the speed of the engine 12 has reached a predetermined speed. As the engine 12 is being re-started, the voltage of the first energy storage device 50 will drop, and then the voltage will recover as the load lightens and disappears. At some point, the voltage of the first energy storage device 50 will come back up to the same voltage or near the same voltage as the second energy storage device 52. In one embodiment, the controller 60 places the switching device 54 in the on-state at that time. If the voltage of the first energy storage device 50 does not come back up near the same voltage as the second energy storage device 52, then the controller 60 may cause the motor/generator 36 to generate electricity to raise the voltage of the first energy storage device, so that the switching device 54 may be placed in the on-state without lowering the voltage of the second energy storage device 52 and the vehicle electrical system 58.

Figure 2:
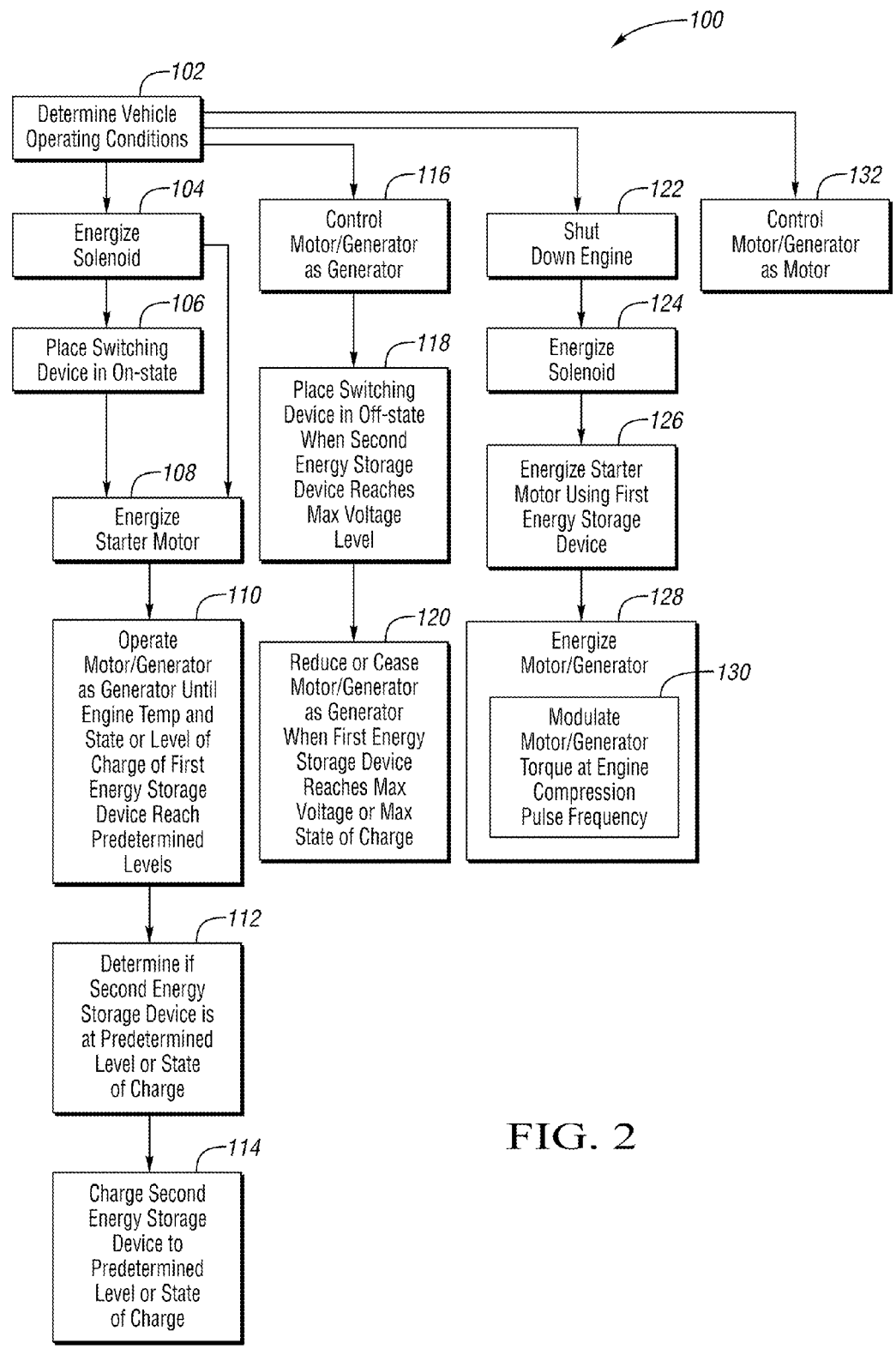
FIG. 2 is a flow diagram of a method of restarting the engine of FIG. 1.

Specifically, a method 100 of controlling the powertrain 11 using the controller 60 is shown as a flowchart in FIG. 2. The method 100 begins with block 102, in which vehicle operating conditions are determined. The vehicle operating conditions are as described above, and are calculated or estimated based on input signals received by the controller 60 from sensors and other known components. For example, if the vehicle operating conditions determined in block 102 indicate that a key start of the engine 12 has been initiated, such as by a signal that a key has been turned in the vehicle ignition, then the solenoid 32 is energized to engage the starter gear 30 in block 104 and the switching device 54 is placed in the on-state in block 106. The starter motor 26 is energized in block 108 when the key is turned in the ignition to complete an electrical circuit with both energy storage devices 50, 52 providing power to the starter motor 26. The engine 12 then runs or idles until the engine temperature and the temperature and state of charge or level of charge of the first energy storage device 50 reach predetermined levels as determined in block 110, with the motor/generator 36 functioning as a generator to charge the first energy storage device 50. In block 112, it is determined whether the state of charge or level of charge of the second energy storage device 52 is at a predetermined level. If it is not, then the motor/generator 36 is controlled to function as a generator to charge the second energy storage 52 device to a predetermined state of charge or charge level in block 114. The switching device 54 remains in the on-state during this time. When the second energy storage device 52 reaches a predetermined state of charge or level of charge, the method 100 returns to block 102.

If the controller 60 determines in block 102 that the vehicle 10 is decelerating, it may control the motor/generator 36 to operate as a generator in a regenerative mode in block 116 to assist in slowing the wheels 23. If the voltage provided by the motor/generator 36 rises to the maximum level of operating voltage that is acceptable for the second energy storage device 52 of the vehicle accessory system 14, then, if the switching device 54 is in the on-state, it is placed in the off-state in block 118. The second energy storage device 52 is thus actively isolated from the motor/generator 36 during regenerative braking, and the second energy storage device 52 and vehicle electrical system 58 are thus not subjected to the high voltage levels that may be suitable for the first energy storage device 50. In block 120, if it is determined that the first energy storage device 50 has reached its predetermined maximum level of operating voltage or predetermined maximum state of charge, operation of the motor/generator 36 as a generator is then reduced (due to voltage) or ceased (due to state of charge). The method then returns to block 102.

If it is determined in block 102 that the engine 12 is not required to propel the vehicle 10, and if the temperature of the engine 12 and the state of charge and level of charge of the first energy storage device 50 are at or above predetermined levels, then the engine 12 is shutdown in block 122 and the solenoid 32 is energized to engage the starter gear 30 in block 124. At this point, the vehicle 10 may still be decelerating or may be at a standstill (e.g., stopped at a traffic light). If the controller 60 receives an input signal indicating that vehicle acceleration is imminent, such as by the release of the brake pedal, then the switching device 54 is placed in the off-state if it is not already in the off-state and, in block 126, the starter motor 26 is energized using power from the first energy storage device 50 to restart the engine 12. The motor/generator 36 is also energized in block 128. In one embodiment, block 128 occurs simultaneously with block 126 so that both the starter motor 26 and the motor/generator 36 provide torque during the entire restart (i.e., from an engine speed of zero to full idle speed). In another embodiment, block 128 occurs only after the starter motor 26 has caused the engine 12 to reach a predetermined speed or after a predetermined amount of time has passed since the starter motor 26 was energized. This allows the starter motor 26 to assist with the restart during the higher torque, lower speed beginning portion of the restart and the motor/generator 36 to assist during the lower torque, higher speed latter portion of the restart. The motor/generator 36 may thus be designed to provide only a relatively low torque, enabling a cost savings over motor/generators that provide a higher torque output.

With the switching device 54 in the off-state, only the first energy storage device 50 is available to provide electric power for restarting the engine 12. The second energy storage device 52 may be a lead-acid battery, which provides good starting at relatively cold temperatures, but is not required during a restart event at relatively warm temperatures. Thus, by keeping the switching device 54 in the off-state, the energy storage device 52 is isolated from both the starter motor 26 and from the motor/generator 36 and is not used during the restart. Optionally, if the operating temperature of the first energy storage device 50 is below a predetermined temperature, then the switching device 54 may be placed in the on-state so that the second energy storage device 52 is also used during the restart, as it may be a lead-acid battery better suited for low temperature performance.

Optionally, in block 130, the torque provided by the motor/generator 36 during block 128 may be modulated at a compression pulse frequency of the torque provided by the engine 12 to smooth the torque at the crankshaft 14, improving start quality. The compression pulse frequency at which the motor/generator 36 is modulated may be a predetermined frequency or may be based on actual feedback indicative of the operating compression pulses. In block 128, when the controller 60 determines that the restart is complete, such as by determining that the engine 12 is operating at a speed at or above idle speed, the method 100 returns to block 102.

If the controller 60 determines in block 102 that the fuel has been shutoff to the engine 12 during deceleration, and relatively light acceleration is subsequently required that does not require a restart of the engine 12 and can be accommodated by the motor/generator 36 alone, then in block 132, the controller 60 controls the motor/generator 36 to function as a motor to provide torque at the crankshaft 14 to extend the period in which fuel is shutoff, thereby increasing fuel economy of the vehicle 10.

While the best modes for carrying out the invention have been described in detail, those familiar with the art to which this invention relates will recognize various alternative designs and embodiments for practicing the invention within the scope of the appended claims.

The invention claimed is:

1. A method of restarting an engine of a vehicle comprising:
   determining via a controller vehicle operating conditions requiring a restart of the engine following cutoff of engine fuel during an automatic shutdown subsequent to a key start of the engine;
   determining an operating parameter of at least one of the engine, a first energy storage device, and a second energy storage device; wherein the first energy storage device is operable in a first range of operating voltage having a first minimum voltage and a first maximum voltage; wherein the second energy storage device is operable in a second range of operating voltage having a second minimum voltage and a second maximum voltage; wherein the second maximum voltage is greater than or equal to the first minimum voltage and less than the first maximum voltage;
   placing a switching device in an off-state to operatively disconnect both a starter motor and a motor/generator from the second energy storage device if the operating parameter is different than a predetermined reference parameter by at least a predetermined amount;
   energizing a solenoid to thereby operatively connect the starter motor with the engine through a gear train; and
   after said energizing the solenoid, powering the starter motor and operating the motor/generator as a motor to restart the engine.

2. The method of claim 1, wherein the controller is operable to cause the motor/generator to be powered as a motor during the entire restart.

3. The method of claim 1, wherein the controller is operable to cause the motor/generator to be powered during the restart only after the starter motor has caused the engine to reach a predetermined speed or after a predetermined amount of time has passed since the starter motor was powered.

4. The method of claim 1, further comprising:
   determining vehicle operating conditions indicative of a vehicle deceleration;
   placing the switching device in the off-state if the switching device is in the on-state; and
   operating the motor/generator as a generator to provide power to the first energy storage device and thereby slow an output member in a regenerative braking mode.

5. The method of claim 1, further comprising:
   determining vehicle operating conditions indicative of a need for vehicle acceleration after engine fuel cutoff; and
   operating the motor/generator as a motor to accelerate the vehicle and extend engine fuel cutoff.

6. The method of claim 1, wherein powering the motor/generator includes modulating torque provided by the motor/generator at a compression pulse frequency of the engine.

7. The method of claim 1, further comprising:
   determining vehicle operating conditions indicative of initiation of the key-start of the engine; and
   closing the switching device and powering the starter motor as a motor when the key-start is initiated.

8. The method of claim 1, further comprising:
   determining vehicle operating conditions indicative of vehicle deceleration;
   operating the motor/generator as a generator to provide power to the first energy storage device and to the second energy storage device to thereby slow an output member of the powertrain in a regenerative braking mode;
   placing the switching device in the off-state when the second energy storage device reaches a maximum voltage level; and
   reducing or ceasing operation of the motor/generator as a generator when the first energy storage device reaches a maximum voltage or maximum state of charge.

9. The method of claim 1, further comprising:
   determining vehicle operating conditions require acceleration of the vehicle while fuel is shut off to the engine; and
   controlling the motor/generator to function as a motor to provide torque at a crankshaft of the engine.

\* \* \* \* \*